(12) United States Patent
Bachman et al.

(10) Patent No.: US 9,802,674 B2
(45) Date of Patent: Oct. 31, 2017

(54) POWER UNIT ATTACHABLE TO A BICYCLE

(71) Applicant: Ford Global Technologies, LLC, Dearborn, MI (US)

(72) Inventors: Paul James Bachman, New Baltimore, MI (US); Dustin Robert Williams, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 322 days.

(21) Appl. No.: 14/507,792

(22) Filed: Oct. 6, 2014

(65) Prior Publication Data

US 2016/0096587 A1  Apr. 7, 2016

(51) Int. Cl.
*B62M 6/70*  (2010.01)
*F16H 7/18*  (2006.01)
*B62M 9/16*  (2006.01)

(52) U.S. Cl.
CPC .............. *B62M 6/70* (2013.01); *B62M 9/16* (2013.01); *F16H 7/18* (2013.01)

(58) Field of Classification Search
CPC . B62M 6/70; B62M 9/16; B62M 6/45; B62M 6/55; B62M 6/60; F16H 7/18
See application file for complete search history.

(56) References Cited

U.S. PATENT DOCUMENTS

| | | | | |
|---|---|---|---|---|
| 2,457,430 A | * | 12/1948 | Argyris | B62M 6/70 180/206.7 |
| 3,121,575 A | * | 2/1964 | Bourgi | B62M 9/16 280/236 |
| 3,318,403 A | * | 5/1967 | Hansen | B62B 13/18 180/185 |
| 4,034,821 A | * | 7/1977 | Stoddard | B62M 9/16 180/227 |
| 4,541,500 A | * | 9/1985 | Gelhard | B62M 6/70 180/205.2 |

(Continued)

FOREIGN PATENT DOCUMENTS

| | | |
|---|---|---|
| CN | 2825435 Y | 10/2006 |
| DE | 10227737 A1 | 1/2004 |

(Continued)

OTHER PUBLICATIONS

Bike Europe—Launch of World's 1st Hydrogen Fuel Cell E-Bike, May 30, 2013, www.bike-eu.com, 6 pages.

(Continued)

*Primary Examiner* — Kevin Hurley
*Assistant Examiner* — Gabriela C Craciun
(74) *Attorney, Agent, or Firm* — Frank A. MacKenzie; Bejin Bieneman PLC

(57) ABSTRACT

A power unit includes a drive unit and a power sprocket for engaging the transmission band of a bicycle. The power unit includes a first free-wheeling sprocket arranged on a first side of the power sprocket and a second free-wheeling sprocket arranged on a second side of the power sprocket. The power sprocket receives the transmission band from the first free-wheeling sprocket on the first side and passes the transmission band to the second free-wheeling sprocket.

18 Claims, 8 Drawing Sheets

(56) References Cited

U.S. PATENT DOCUMENTS

| | | | | |
|---|---|---|---|---|
| 4,705,494 A * | 11/1987 | Gibson | ............... | F16H 7/18 |
| | | | | 474/109 |
| 5,054,801 A * | 10/1991 | Maguire | ............... | B62M 9/16 |
| | | | | 280/261 |
| 6,336,516 B1 * | 1/2002 | McNelly | ............... | B62M 6/70 |
| | | | | 180/206.7 |
| 6,979,013 B2 | 12/2005 | Chen | | |
| 7,108,097 B1 * | 9/2006 | Bolton | ............... | B62M 6/55 |
| | | | | 180/206.7 |
| 8,011,462 B2 | 9/2011 | Davies et al. | | |
| 9,434,447 B2 * | 9/2016 | Silva | ............... | B62M 6/55 |
| 2004/0050606 A1 * | 3/2004 | Yang | ............... | B62M 7/12 |
| | | | | 180/220 |
| 2005/0087379 A1 * | 4/2005 | Holland | ............... | B62M 6/60 |
| | | | | 180/206.5 |
| 2007/0084654 A1 | 4/2007 | Kobayashi | | |
| 2009/0266636 A1 * | 10/2009 | Naegeli | ............... | B62M 6/60 |
| | | | | 180/206.5 |
| 2011/0284303 A1 * | 11/2011 | Shwartz | ............... | B62M 6/70 |
| | | | | 180/220 |
| 2012/0048635 A1 * | 3/2012 | Kuroki | ............... | B62M 6/45 |
| | | | | 180/206.2 |
| 2013/0054066 A1 * | 2/2013 | Watarai | ............... | B62M 6/45 |
| | | | | 701/22 |
| 2014/0166386 A1 | 6/2014 | Arimune et al. | | |
| 2014/0357437 A1 * | 12/2014 | Hara | ............... | B62M 9/16 |
| | | | | 474/113 |
| 2016/0167733 A1 * | 6/2016 | Kawakami | ............... | B62M 6/50 |
| | | | | 180/220 |
| 2016/0311500 A1 * | 10/2016 | Kasai | ............... | B62M 6/45 |

FOREIGN PATENT DOCUMENTS

| | | |
|---|---|---|
| EP | 1398263 A1 | 3/2004 |
| EP | 2176117 B1 | 3/2011 |
| JP | H08119180 A | 5/1996 |
| JP | H1179059 A | 3/1999 |
| JP | 2006199122 A | 8/2006 |
| JP | 2007112406 A | 5/2007 |
| WO | 2015113955 A1 | 8/2015 |

OTHER PUBLICATIONS

GB Search Report dated Mar. 30, 2016 (3 pages).

* cited by examiner

POWER UNIT ATTACHABLE TO A BICYCLE

BACKGROUND

Some owners of a bicycle may wish to upgrade their bicycle by adding a power unit. Adding a power unit, including adding a drive sprocket to engage and drive the chain on the bicycle, is a convenient way to perform this upgrade. However, similar to the situation of the second rider on a bicycle built for two, a drive sprocket arranged to engage the chain between a pedal sprocket and the rear wheel sprocket of the bicycle will only engage a small portion of the chain, and will therefore only transfer a small amount of torque.

DETAILED DESCRIPTION

With reference to the Figures, wherein like numerals indicate like parts throughout the several views, a bicycle with a power unit is shown. The bicycle includes a transmission band to transmit power from a pedal assembly to the rear wheel of the bicycle. The power unit is attachable to the bicycle such that it engages the transmission band of the bicycle to provide power assist. The power unit includes a power sprocket to drive the transmission band of the bicycle, and two free-wheeling sprockets, arranged on opposite sides of the power sprocket. The two free-wheeling sprockets are configured to guide the transmission band through the power unit such that the transmission band is wrapped around a portion of the power sprocket. The term "wrap" refers to a length of the transmission band that is in contact with a sprocket. The phrase "increasing the wrap" refers to increasing the amount of the transmission band in contact with the sprocket. Increasing the wrap of the transmission band around the power sprocket improves the power transmission between the power sprocket and the transmission band.

Providing the power unit with two free-wheeling sprockets has the advantage that the transmission band may be guided through the power unit in a serpentine manner, allowing the wrap of the transmission band around the power sprocket to be optimized. The wrap of the transmission band around the power sprocket can be adjusted by adjusting the placement of the free-wheeling sprockets with respect to the power sprocket.

Figure 1:
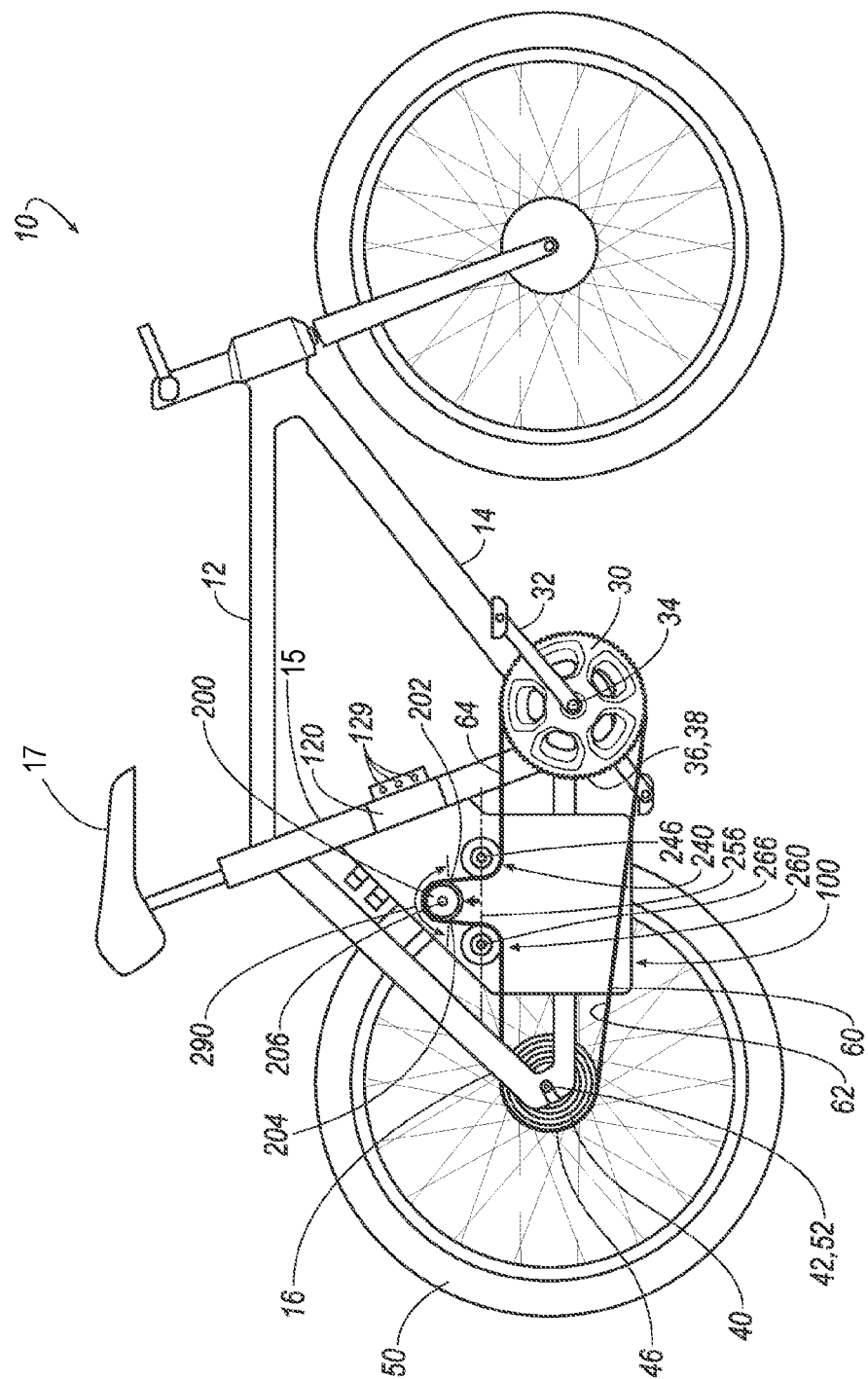
FIG. 1 is a side view of a bicycle with a power unit attached, showing a first configuration of a drive sprocket and first and second free-wheeling sprockets.

As shown in FIG. 1, a bicycle 10 includes a frame 12 having a middle portion 14 and a rear portion 16. The bicycle 10 includes a pedal sprocket 30, a pedal assembly 32, a rear wheel sprocket 40 and a rear wheel 50. The bicycle 10 further includes a transmission band 60 and a power unit 100.

The pedal sprocket 30 is circular and rotatably mounted on the middle portion 14 of the frame 12. The pedal sprocket 30 is configured to rotate about a pedal axis 34. The pedal sprocket 30 is drivable by the pedal assembly 32. The pedal sprocket 30 includes an outer periphery 36. The outer periphery 36 of the pedal sprocket 30 is configured to engage the transmission band 60 and may be smooth or may include teeth 38.

The pedal assembly 32 is rotatably mounted on the middle portion 14 of the frame 12 and is configured to rotate about the pedal axis 34. The rotation of the pedal assembly 32 about the pedal axis 34 drives the pedal sprocket 30.

The rear wheel sprocket 40 is circular, rotatably mounted on the rear portion 16 of the frame 12 and includes an outer periphery 46. The rear wheel sprocket 40 is configured to rotate about a rear wheel axis 52 and to drive the rear wheel 50. The outer periphery 46 of the rear wheel sprocket 40 is configured to engage the transmission band 60 and may be smooth or may include teeth (not shown).

The rear wheel 50 is rotatably mounted on the rear portion of the frame 12 and is configured to rotate about the rear wheel axis 52. The rear wheel 50 is configured to be drivable by the rear wheel sprocket 40.

The transmission band 60 forms a continuous loop, includes an inside surface 62 and an outside surface 64 and is configured to transmit power from the pedal sprocket 30 to the rear wheel sprocket 40. The transmission band 60 may be, for example, a rubber belt having a smooth inside surface 62 and smooth outside surface 64. In this case, the outer periphery 36 of the pedal sprocket 30 and the outer periphery 46 of the rear wheel sprocket may be smooth surfaces for engaging the smooth surface on the inside surface 62 and outside surface 64 of the transmission band 60. Alternatively, the transmission band 60 may be a chain having links. In this case, the outer periphery 36 of the pedal sprocket 30 may have teeth 38 and the outer periphery 46 rear wheel sprocket 40 may have teeth 48 for engaging the links of the transmission band 60. Alternatively, the transmission band 60 may be made of other materials, for example synthetic rubbers or plastics, etc. The transmission band 60 may also have different types of surface structure. For example, one of both of the inside surface 62 and outside surface 64 may be provided with ridges or other features.

As shown in FIGS. 2 and 3A-3C, the power unit 100 may have a casing 101, a clamp 120 for attaching the power unit 100 to the frame 12 of the bicycle 10, a drive unit 140, and a fuel cell 150 for providing power to the drive unit 140. The power unit 100 may further include a power sprocket 200 drivable by the drive unit 140, a first free-wheeling sprocket 240 and a second free-wheeling sprocket 260.

The casing 101 may be made, for example, of plastic or metal material and have an upper portion 102, a lower portion 104, a rear edge 106, a front upper edge 108, a front lower edge 109, an outer side 110 and an inner side 112. The lower portion 104 may have a thin portion 114 configured to support one or more of the power sprocket 200 and the first and second free-wheeling sprockets 240, 260, and to fit into a space between the bicycle frame 12 and a path of the transmission band 60. The casing 101 may form openings 153 for receiving a plurality of fuel canisters 152, and holes 113 for receiving and supporting the power sprocket 200, first free-wheeling sprocket 240 and second free-wheeling sprocket 260. For the purposes of this document, a side of the power unit 100 including the front upper edge 108 and front lower edge 190 will be referred as the front side 103 of the power unit 100. A side of the power unit 100 including the rear edge 106 will be referred to as the rear side 105 of the power unit 100.

The clamp 120 may be made of plastic or metal material and may have a first side 122 and a second side 124 and extend from the front upper edge 108. The first side 122 and second side 124 of the clamp 120 may be configured to attach to a portion 15 of the frame 12 for supporting a seat 17 of the bicycle 10, as shown in FIG. 1. The clamp 120 may further include a first side fastener 126 and a second side fastener 128. The first and second side fasteners 126, 128 may form holes 129 for receiving bolts such that the clamp 120 may be bolted to the frame 12. Alternatively, any suitable form of clamp or fastener or combination of clamp and fastener may be used to attach the power unit 100 to the frame 12.

The drive unit 140 is configurable to drive the power sprocket 200. For example, the drive unit 140 may include an electric motor 142. The electric motor 142 may be fixedly attached to an axle 144 extending from the electric motor 142 to the power sprocket 200. The axle 144 may be fixedly attached to a center 202 of the power sprocket 200. Alternatively, the drive unit 140 may include a transmission unit (not shown) configured to be driven by the electric motor 142 and to drive the power sprocket 200.

The fuel cell 150 may be a hydrogen fuel cell for converting hydrogen fuel to electrical energy and may include fuel canisters 152. The fuel cell 150 may be configured to power an electric motor 142 in the drive unit 140. An electric cable 154 may connect the fuel cell 150 to the drive unit 140. The fuel canisters 152 may incorporate metal hydride hydrogen storage. Alternatively, other forms of hydrogen storage such as compressed gas hydrogen storage may be used. The fuel canisters 152 may be hot swappable. That is, the fuel canisters 152 may be removable from the fuel cell 150, for example when the fuel canister is empty. After removal, another fuel canister 152 may be inserted into the fuel cell 150.

Alternatively, the power unit 100 may include a combustion engine (not shown) configured to drive the power sprocket 200.

The power sprocket 200 is rotatably mounted on the casing 101 of the power unit 100 and has a first side 202 facing the front side 103 of the power unit 100 and a second side 204 facing the rear side 105 of the power unit 100. The power sprocket 200 defines a center 206 and has an outer periphery 208. An axle 144 is fixedly attached to the center 206 of the power sprocket 200 and passes through the casing 101. A spacer 205 may be used to space the power sprocket 200 away from the casing 101. As described above, the axle 144 may connect to the electric motor 142 such that the electric motor may drive the power sprocket 200. Alternatively, the connection between the electric motor 142 and the power sprocket 200 may include, for example, a transmission (not shown). The outer periphery 208 of the power sprocket 200 may have a smooth surface or may have teeth (not shown). The power sprocket 200 is configured to receive the transmission band 60 from the first free-wheeling sprocket 240 on the first side 202 and to pass the transmission band 60 to the second free-wheeling sprocket 260 from the second side 204.

Figure 2:
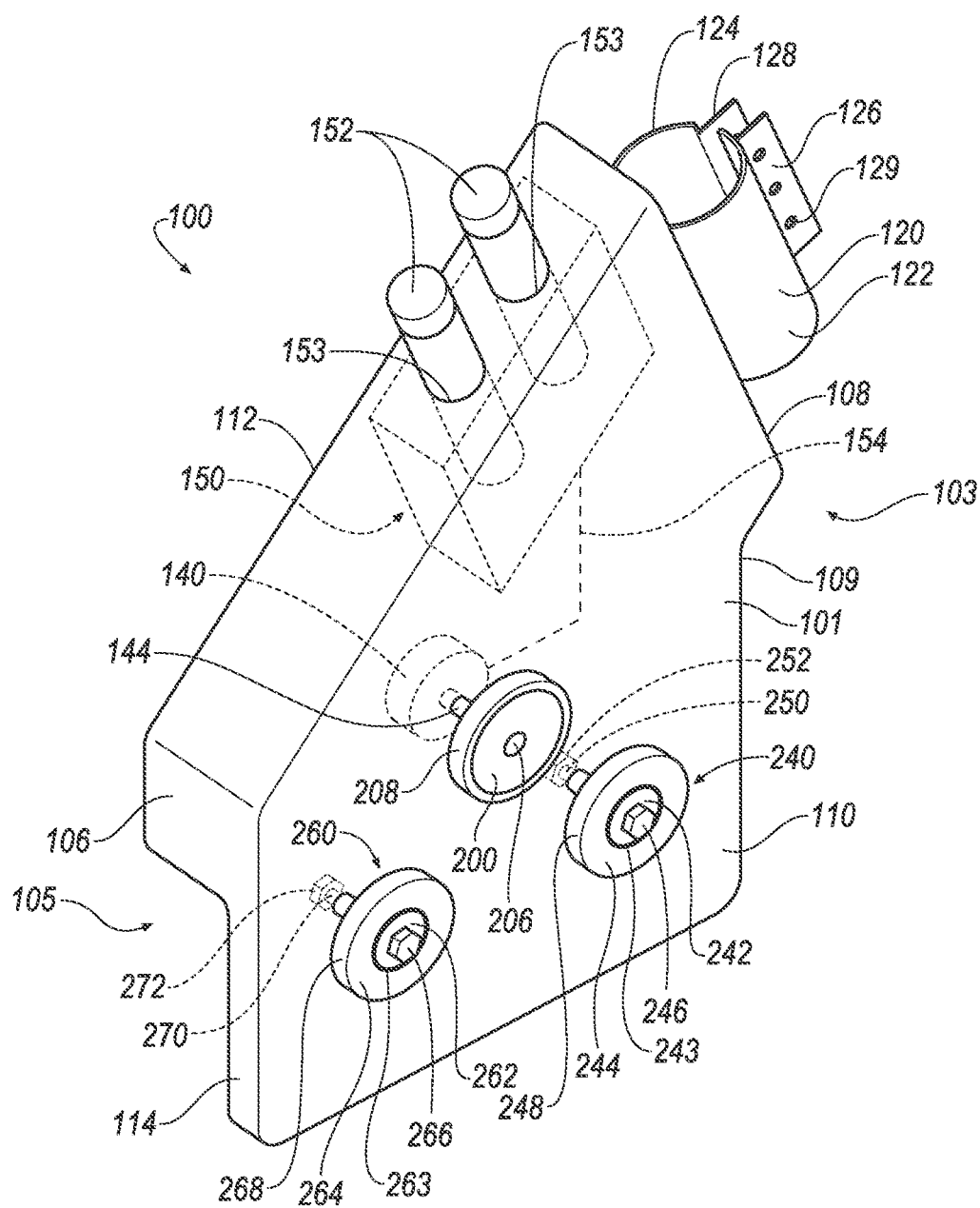
FIG. 2 is a perspective view of a power unit.
Figure 3A:
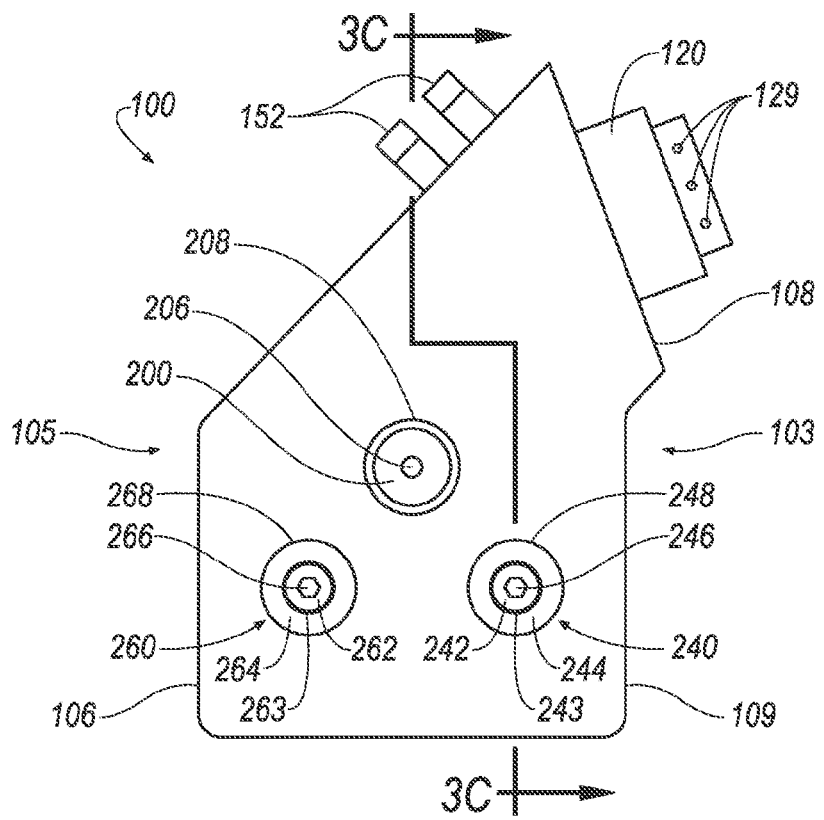
FIG. 3A is a side view of the power unit of FIG. 2.
Figure 3B:
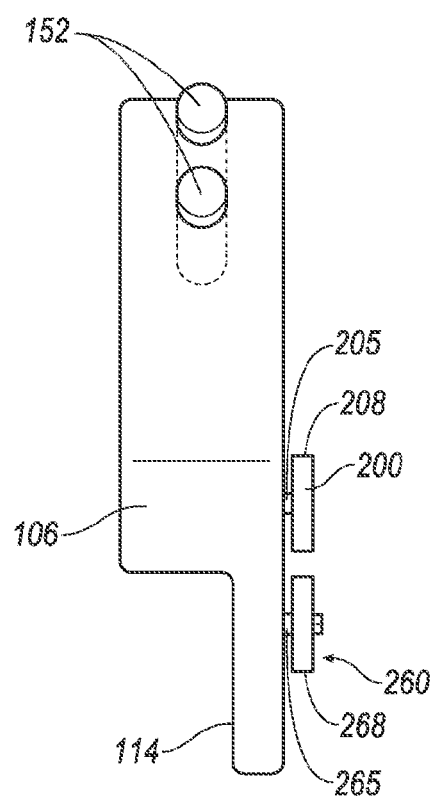
FIG. 3B is a rear view of the power unit of FIG. 2.
Figure 3C:
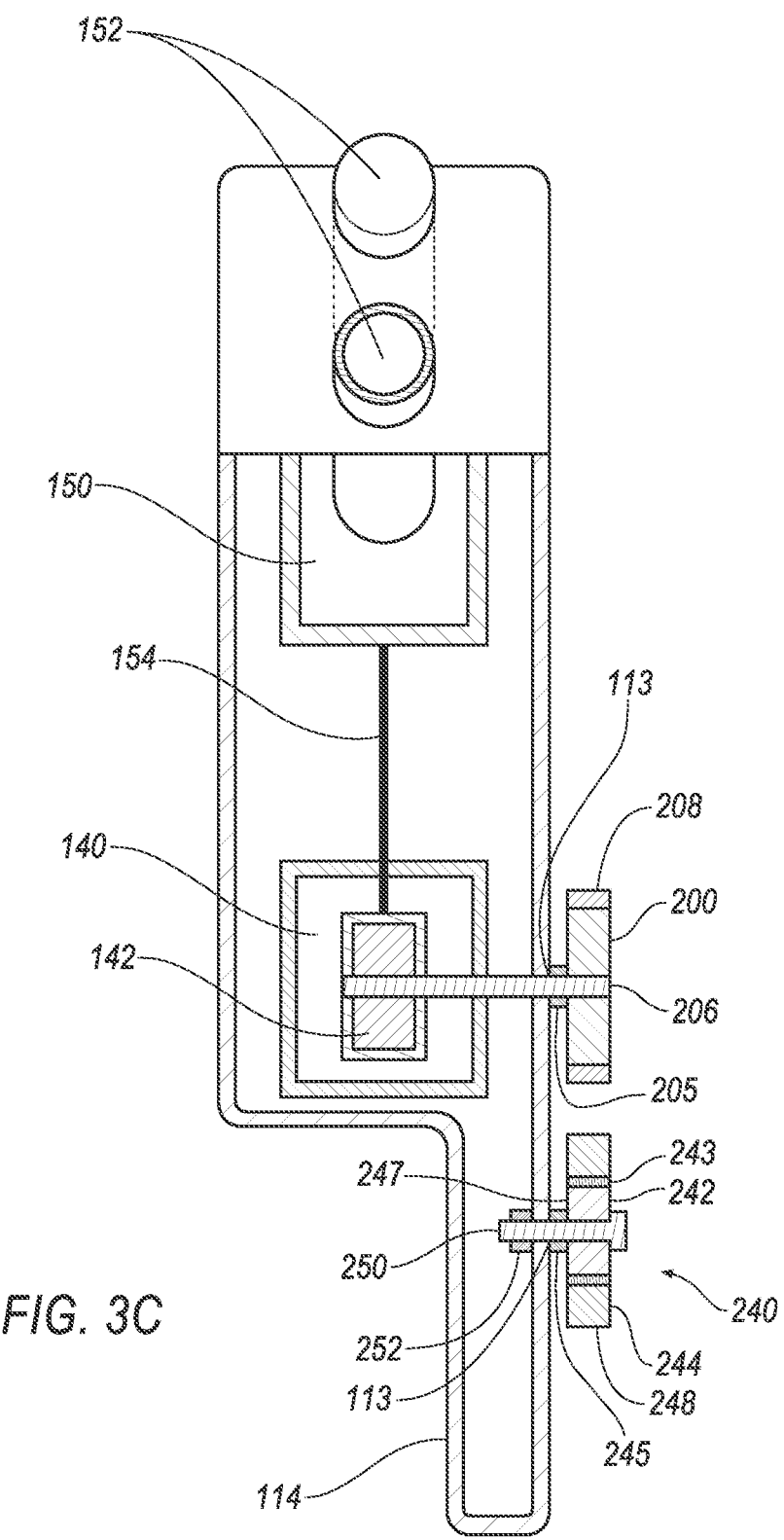
FIG. 3C is a cut-away view of the power unit, as indicated in FIG. 3A.

The first free-wheeling sprocket 240 is mounted on the casing 101 of the power unit 100. The first free-wheeling sprocket defines a center 246, and may include an inner fixed portion 242, an outer rotating portion 244 rotatable about the inner fixed portion 242 and an outer periphery 248. The first free-wheeling sprocket 240 may further include bearings 243 disposed between the inner fixed portion 242 and the outer rotating portion 244. The first free-wheeling sprocket 240 may be arranged on the first side 202 of the power sprocket 200 and spaced away from the power sprocket 200. As shown in FIG. 2, the first free-wheeling sprocket 240 may be arranged between the first side 202 of the power sprocket 200 and the front side 103 of the power unit 100 in a front-rear direction as referenced to the front side 103 and rear side 105 of the power unit 100. The inner fixed portion 242 of the first free-wheeling sprocket 240 may form a hole (not shown) for receiving a bolt 250. The bolt 250 and a nut 252 may be used to fixably attach the inner fixed portion 242 of the first free-wheeling sprocket 240 to the casing 101. The inner fixed portion 242 may include a spacer portion 245 extending from an inner face 247 for maintaining space between the first free-wheeling sprocket 240 and the casing 101. Other methods, i.e., a hole formed on the inner fixed portion 242 that is configured to snap onto an axle extending from the casing 101, for attaching the first free-wheeling sprocket 240 to the casing 101 while allowing the outer rotating portion 244 to freely rotate, may be used.

The second free-wheeling sprocket 260 is mounted on the casing 101 of the power unit 100. The second free-wheeling sprocket 260 defines a center 266, includes an inner fixed portion 262, an outer rotating portion 264 rotatable about the inner fixed portion 262 and an outer periphery 268. The second free-wheeling sprocket 260 may further include bearings 263 disposed between the inner fixed portion 262 and the outer rotating portion 264. The second free-wheeling sprocket 260 may be arranged on the second side 204 of the power sprocket 200 and spaced away from the power sprocket 200. As shown in FIG. 2, the second free-wheeling sprocket 260 may be arranged between the second side 204 of the power sprocket 200 and the rear side 105 of the power unit 100 in a front-rear direction as referenced to the front side 103 and rear side 105 of the power unit 100. The inner fixed portion 262 of the second free-wheeling sprocket 260 may form a hole (not shown) for receiving a bolt 270. The bolt 270 and a nut 272 may be used to fixably attach the inner portion 262 of the first free-wheeling sprocket 260 to the casing 101. Other methods, i.e., a hole formed on the inner fixed portion 262 that is configured to snap onto an axle extending from the casing 101, for attaching the second free-wheeling sprocket 260 to the casing 101 while allowing the outer rotating portion 264 to freely rotate, may be used.

The first free-wheeling sprocket 240 is configured to receive the transmission band 60 from the pedal sprocket 30 and pass the transmission band 60 to the power sprocket 200. The power sprocket 200 is configured to receive the transmission band 60 from the first free-wheeling sprocket 240 on the first side 202 and pass the transmission band 60 to the second free-wheeling sprocket 260 on the second side 204. The second free-wheeling sprocket 260 is configured to receive the transmission band 60 from the second side 204 of the power sprocket 200 and pass the transmission band 60 to the rear wheel sprocket 40. The rear wheel sprocket 40 is configured to receive the transmission band 60 from the second free-wheeling sprocket 260.

The transmission band 60 may be configured to travel through the combination of the first free-wheeling sprocket 240, the power sprocket 200 and the second free-wheeling sprocket 260 in a serpentine manner, such that one surface of the transmission band 60 engages the first and second free-wheeling sprockets 240, 260 and another surface of the transmission band 60 engages the power sprocket 200. The one surface refers to one of the inside surface 62 and the outside surface 64 of the transmission band 60. The other surface refers to the other of the inside surface 62 and the outside surface 64.

For example, the one surface of the transmission band 60 may be the outside surface 64 and the other surface may be the inside surface 62. As shown in FIG. 1, the outside surface 64 of the transmission band 60 may engage the outer periphery 248 of the first free-wheeling sprocket 240. The transmission band 60 may pass between the first freewheeling sprocket 240 and the first side 202 of the power sprocket 200. In this manner the inside surface 62 of the transmission band 60 may engage the outer periphery 208 of the power sprocket 200. The transmission band 60 may further pass between the second side 204 of the power sprocket 200 and the second freewheeling sprocket 260 such that the outside surface 64 of the transmission band 60 may engage the outer periphery 268 of the second freewheeling sprocket 260.

The center 246 of the first free-wheeling sprocket 240 may align with the center 266 of the second free-wheeling sprocket 260, defining a line 256. The center 206 of the power sprocket 200 may be offset from the base line 256. For example, as shown in FIG. 1, the center 206 of the power sprocket 200 may be offset in a direction such that the wrap 290 of the transmission band 60 around the power sprocket 200 increases. For example, the center 206 of the power sprocket 200 is offset in a direction indicated by the wide arrow. As the center 206 of the power sprocket 200 is offset further in the direction of the arrow, the length of a portion 290 of the transmission band 60 that is in contact with the power sprocket 200 increases. From FIG. 1, this direction can be understood to be a direction toward the surface of engagement (in this case the inside surface 62) of the transmission band 60.

Figure 4:
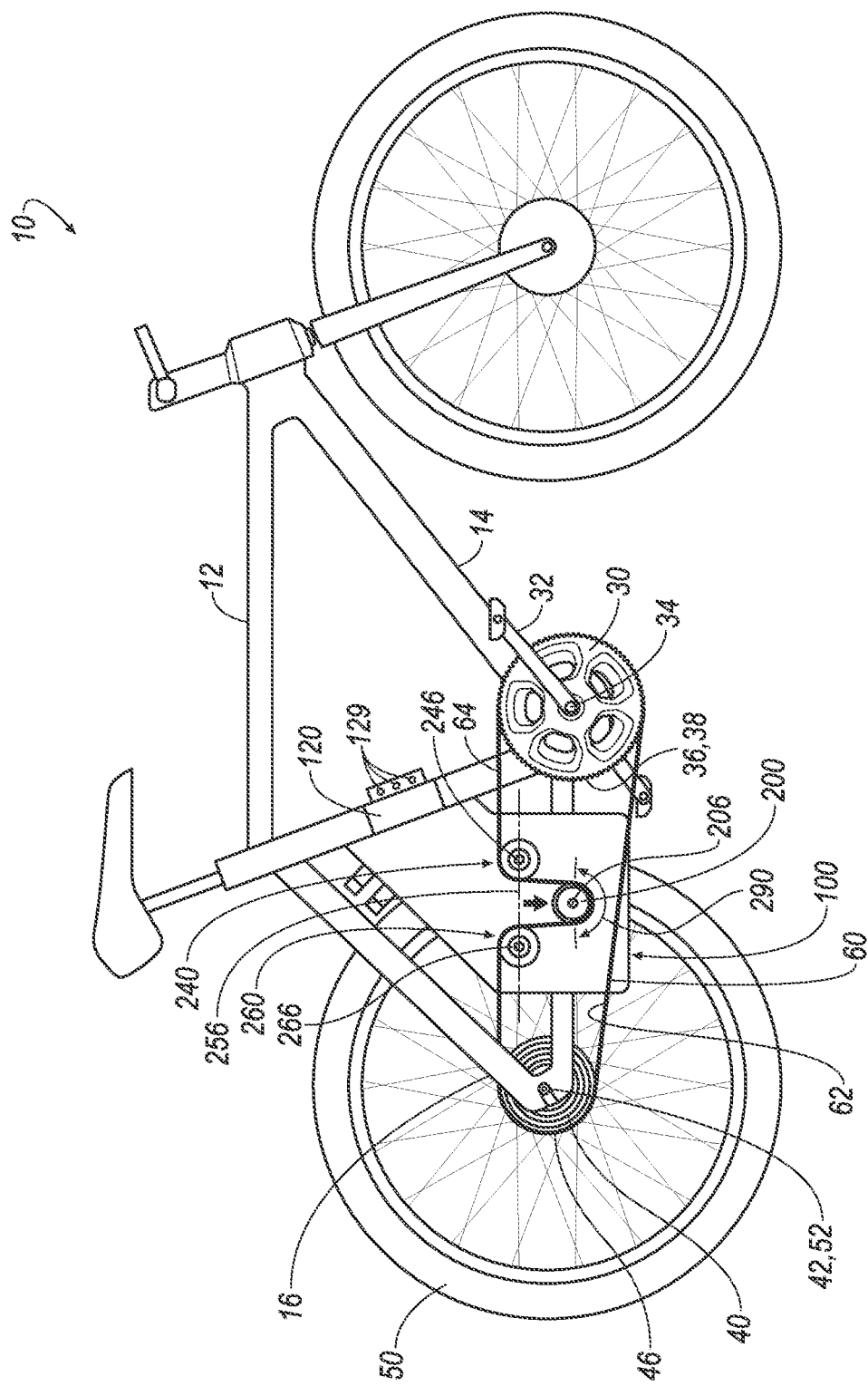
FIG. 4 is a side view of a bicycle with the power unit attached, showing a second configuration of the drive sprocket and first and second free-wheeling sprockets.

Alternatively, the one surface of the transmission band 60 may be the inside surface 62 and the other surface may be the outside surface 64. As shown in FIG. 4, the inside surface 62 of the transmission band 60 may engage the outer periphery 248 of the first freewheeling sprocket 242. The transmission band 60 may pass between the first freewheeling sprocket 240 and the first side 202 of the power sprocket 200. In this manner the outside surface 64 of the transmission band 60 may engage the outer periphery 208 of the power sprocket 200. The transmission band 60 may further pass between the second side 204 of the power sprocket 200 and the second freewheeling sprocket 260 such that the inside surface 62 of the transmission band 60 may engage the outer periphery 268 of the second freewheeling sprocket 260.

The center 206 of the power sprocket 200 may be offset in a direction such that the wrap 290 of the transmission band 60 around the power sprocket 200 increases. The center 206 of the power sprocket 200 is offset further in the direction of the arrow, the length of a portion 290 of the transmission band 60 that is in contact with the power sprocket increases. From FIG. 4, this direction can again be understood to be a direction toward the side of engagement (in this case the outside surface 64) of the transmission band 60.

Figure 5:
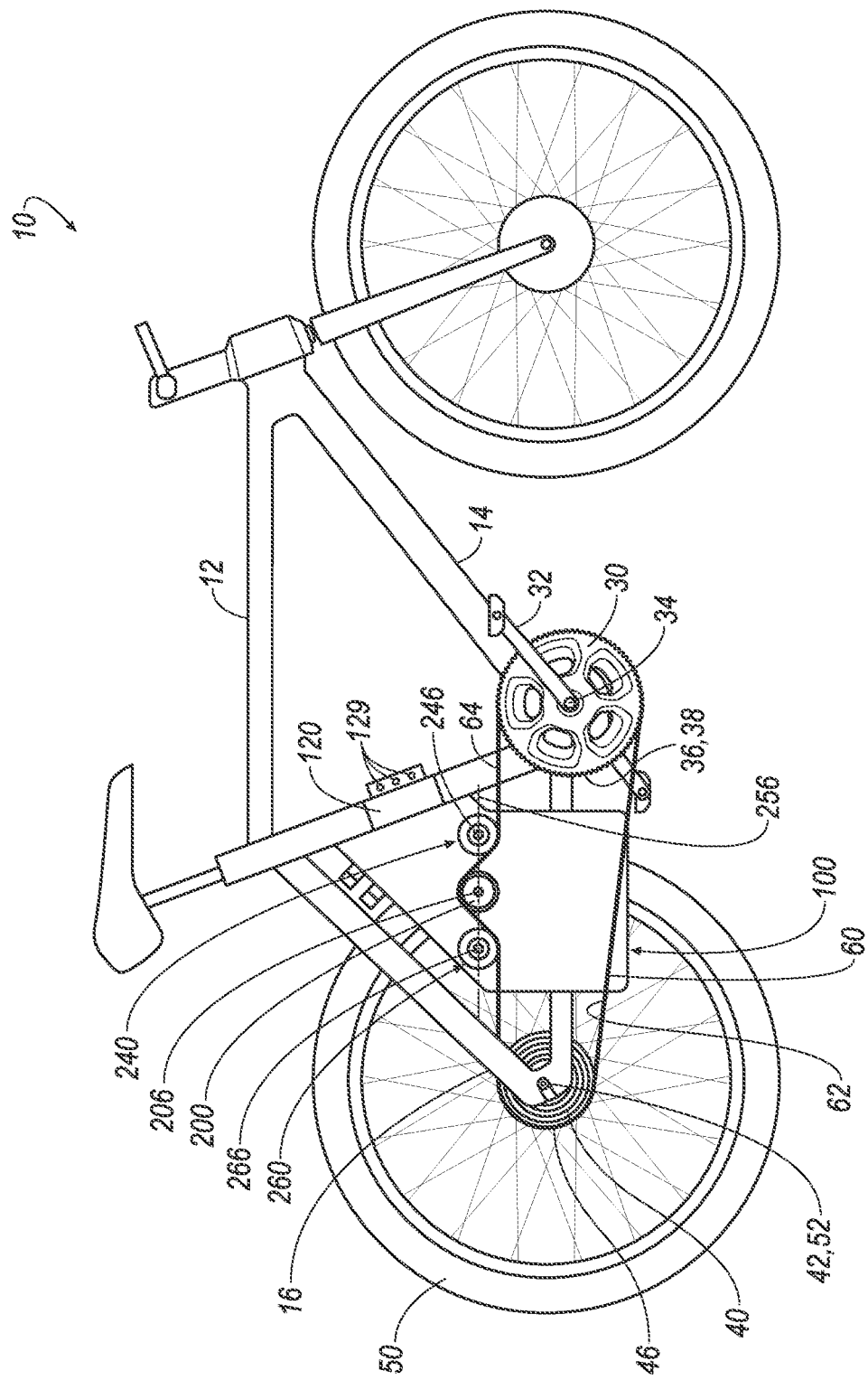
FIG. 5 is a side view of a bicycle with the power unit attached, showing a third configuration of the drive sprocket and first and second free-wheeling sprockets.

The center 206 of the power sprocket 200 may be aligned with the center 246 of the first freewheeling sprocket 240 and the center 266 of the second freewheeling sprocket 260. This configuration is shown in FIG. 5, where the center 206 of the power sprocket 200 is arranged on the base line 256.

The pedal sprocket 30 and the rear wheel sprocket 40 may engage the one surface of the transmission band 60 as engaged by the power sprocket 200, and the first and second free-wheeling sprockets 240, 260 may engage the other surface. For example, as shown in FIGS. 1, 5 and 6, each of the pedal sprocket 30, the rear wheel sprocket 40 and the power sprocket 200 may engage the inside surface 62 of the transmission band 60 and the first and second free-wheeling sprockets 240, 260 may engage the outside surface 64 of the transmission band 60.

Figure 6:
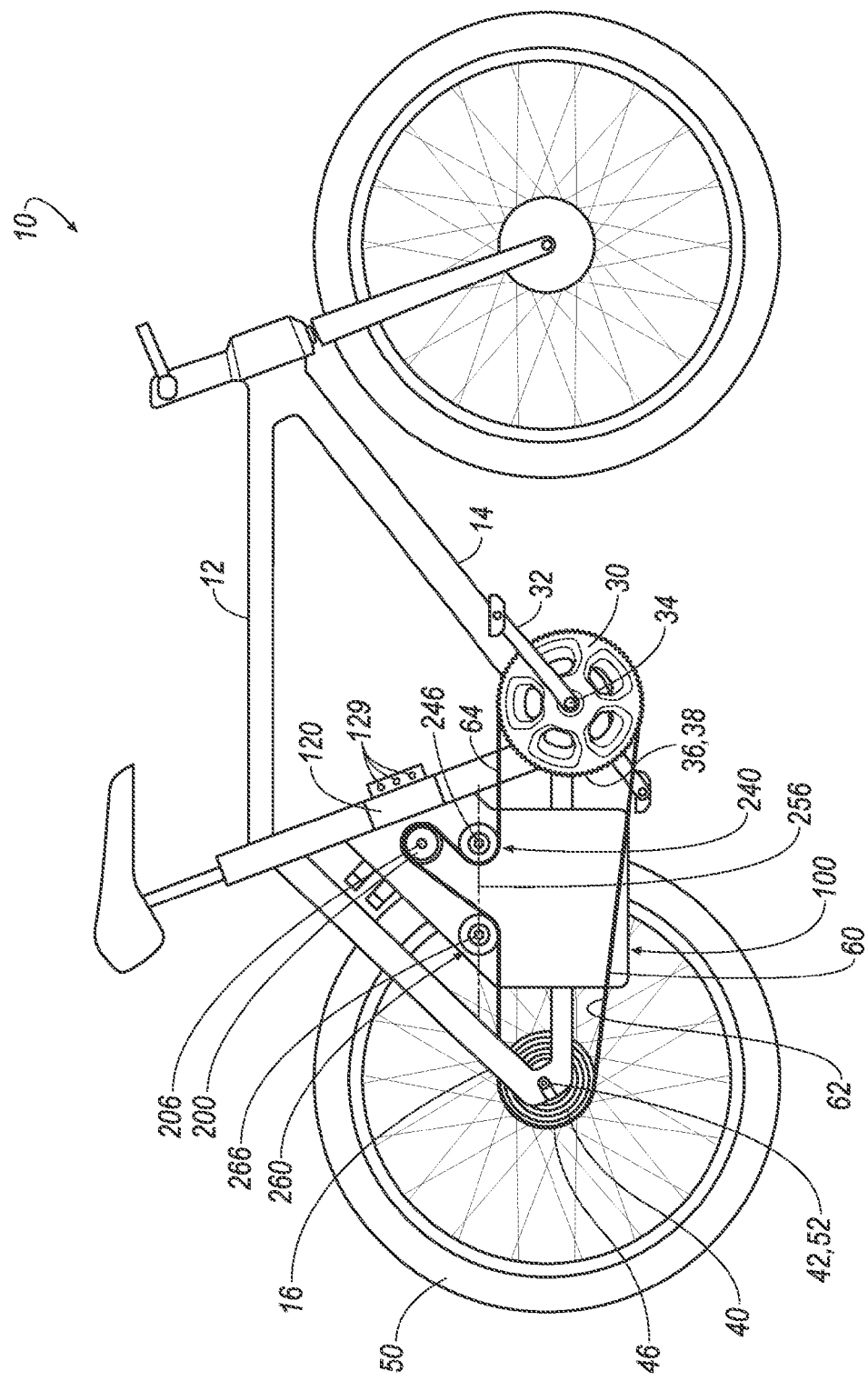
FIG. 6 is a side view of a bicycle with the power unit attached, showing a fourth configuration of the drive sprocket and first and second free-wheeling sprockets.

As shown in FIG. 6, the power sprocket 200 may be offset from the base line 256 such that the power sprocket 200 is located in a more opportune location with respect to the other features of the bicycle 10. For example, the power sprocket 200 may be placed in an area of the power unit 100 that does not overlap with the rear wheel 50. In this manner, there may be more room to place the drive unit 140 behind the power sprocket 200.

Figure 7:
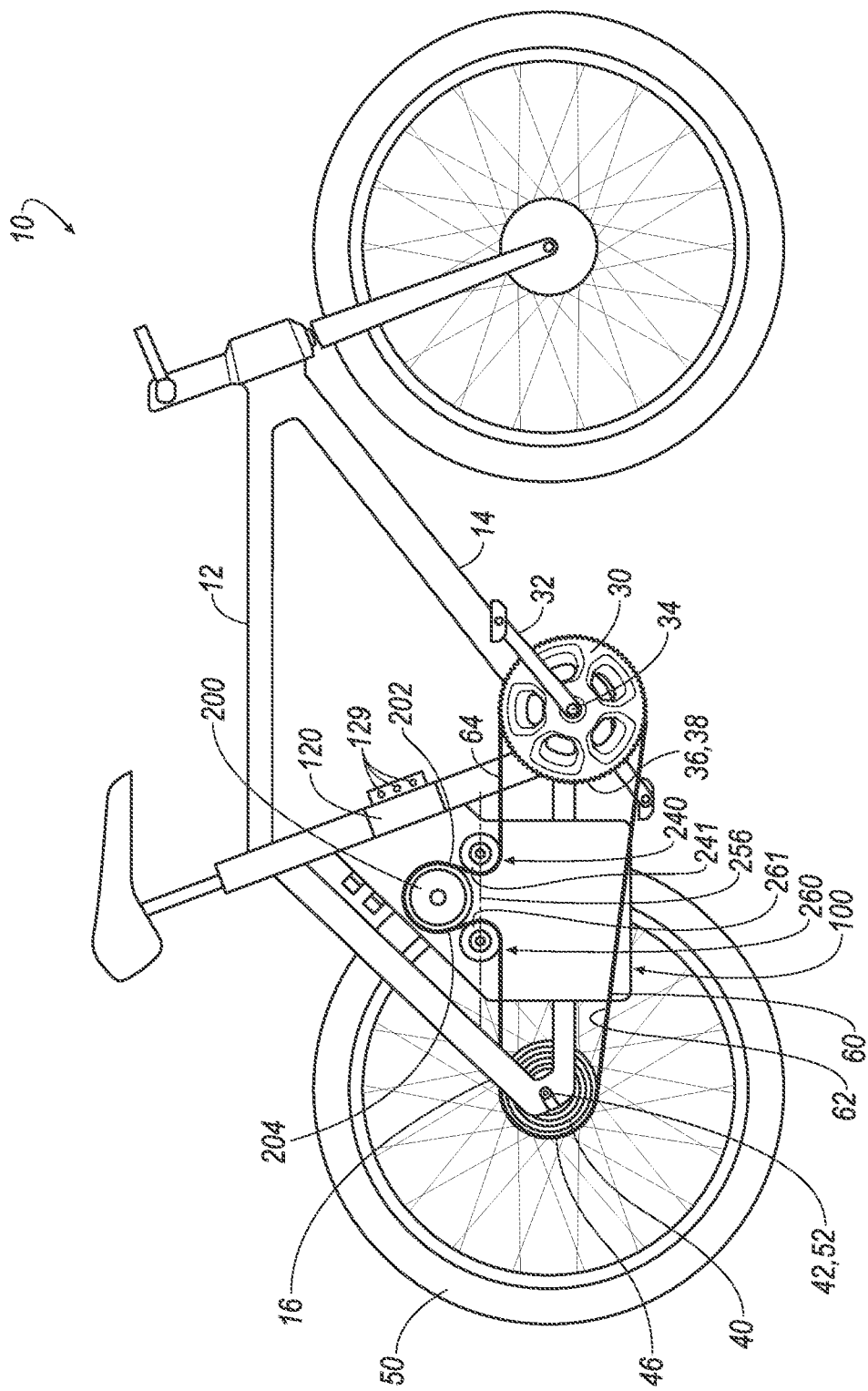
FIG. 7 is a side view of a bicycle with the power unit attached, showing a fifth configuration of the drive sprocket and first and second free-wheeling sprockets.

As shown in FIG. 7, the free-wheeling sprockets 240, 260 may be arranged such that an inner portion 241 of the first free-wheeling sprocket 240 extends beyond the first side 202 of the power sprocket 200 along the front-rear direction of the casing 101, and an inner portion 261 of the second free-wheeling sprocket 260 extends beyond the second side 204 of the power sprocket 200 along the front-rear direction of the casing 101. As can be seen in FIG. 7, this configuration of the first free-wheeling sprocket 240 and second free-wheeling sprocket 260 may result in a wrap of more than 50% of the outer periphery 208 of the power sprocket 200.

Also, as shown in FIG. 7, the power sprocket 200 may be larger in diameter than the free-wheeling sprockets 240, 260. Each of the free-wheeling sprockets 240, 260 and power sprocket 200 may be of different sizes. In order to permit easier mounting of the transmission band 60 onto the power unit 100, one or both of the free-wheeling sprockets 240, 260 may be attached to the casing 101 via a sliding mechanism (not shown) that allows moving the free-wheeling sprockets 240, 260 away from the power sprocket 200 during mounting of the transmission band 60.

The power unit 100 may be constructed as a single unit with a casing 101 as described above. Alternatively, the power unit 100 may be constructed as a plurality of subunits. For example, the power unit could have a first subunit that includes the drive unit 140, power sprocket 200, drive and first and second free-wheeling sprockets 240, 260, and a second subunit that includes the fuel cell 150 and associated components. Other configurations may also be used.

Although the above description refers to a bicycle, the power unit as described above may also be used for a tricycle, a quadracycle, a moped, or any other pedal-powered vehicle.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodi-

The invention claimed is:

1. A power unit for engaging a transmission band on a bicycle comprising: a drive unit including a fuel cell; a casing forming an opening for receiving a hydrogen fuel canister; a power sprocket that is mounted on the casing wherein the casing is mounted behind a portion of a frame of the bicycle supporting a seat and engageable by the transmission band and drivable by the drive unit; a first free-wheeling sprocket mounted on the casing behind the portion of the frame of the bicycle supporting the seat and arranged on a first side of the power sprocket; and a second free-wheeling sprocket mounted on the casing behind the portion of the frame of the bicycle supporting the seat on a second side of the power sprocket, the second side being opposite the first side; wherein the power sprocket is configured to receive the transmission band from the first free-wheeling sprocket on the first side and pass the transmission band to the second free-wheeling sprocket on the second side.

2. The power unit of claim 1, wherein the power sprocket is configured to engage one surface of the transmission band and the first and second free-wheeling sprockets are configured to engage another surface of the transmission band.

3. The power unit of claim 2, wherein each of the power sprocket, the first free-wheeling sprocket, and the second free-wheeling sprocket defines a respective center, the centers of the first and second free-wheeling sprockets define a base line, and the center of the power sprocket is offset from the base line in a direction that increases a wrap of the transmission band around the power sprocket.

4. The power unit of claim 2, wherein each of the power sprocket, the first free-wheeling sprocket, and the second free-wheeling sprocket defines a respective center, the centers of the first and second free-wheeling sprockets define a base line, and the center of the power sprocket is aligned with the center of the first and second free-wheeling sprockets.

5. The power unit of claim 2, wherein the surface of the transmission band engaged by the power sprocket is an inside surface.

6. The power unit of claim 2, wherein the surface of the transmission band engaged by the power sprocket is an outside surface.

7. The power unit of claim 1, wherein the drive unit includes an electric motor.

8. The power unit of claim 1, wherein the fuel cell includes at least one hydrogen fuel canister incorporating metal-hydride hydrogen storage.

9. The power unit of claim 8, wherein the hydrogen fuel canister is removable from the fuel cell.

10. A bicycle comprising: a frame having a rear portion, a portion supporting a seat, and a middle portion; a pedal sprocket drivable by a pedal assembly, the pedal sprocket being rotatably mounted on the middle portion of the frame; a rear wheel sprocket configured to drive a rear wheel, the rear-wheel sprocket being spaced from the pedal sprocket and rotatably mounted on the rear portion of the frame; a transmission band configured to transmit power from the pedal sprocket to the rear-wheel sprocket; a power unit including: a fuel cell; a casing forming an opening for receiving a hydrogen canister; a power sprocket mounted on the casing wherein the casing is mounted behind the portion of the frame supporting the seat and configured to engage the transmission band; a drive unit configured to drive the power sprocket; a first free-wheeling sprocket mounted on the casing behind the portion of the frame supporting the seat and arranged on a first side of the power sprocket; and a second free-wheeling sprocket mounted on the casing behind the portion of the frame supporting the seat on a second side of the power sprocket, the second side being opposite the first side; wherein the power sprocket is configured to receive the transmission band from the first free-wheeling sprocket on the first side and pass the transmission band to the second free-wheeling sprocket on the second side.

11. The bicycle of claim 10, wherein one surface of the transmission band engages the first and second free-wheeling sprockets and another surface of the transmission band engages the power sprocket.

12. The bicycle of claim 11, wherein each of the power sprocket, the first free-wheeling sprocket and the second free-wheeling sprocket define a respective center, the centers of the first free-wheeling sprocket and second free-wheeling sprocket define a base line, and the center of power sprocket is offset from the base line in a direction that increases the wrap of the other side of the transmission band around the power sprocket.

13. The bicycle of claim 11, wherein each of the power sprocket, the first free-wheeling sprocket, and the second free-wheeling sprocket defines a respective center, the centers of the first and second free-wheeling sprockets define a base line, and the center of the power sprocket is arranged on the base line between the center of the first free-wheeling sprocket and the center of the second free-wheeling sprocket.

14. The bicycle of 11, wherein the pedal sprocket, the rear wheel sprocket, and the power sprocket engage a common surface of the transmission band.

15. The bicycle of claim 11, wherein the drive unit includes an electric motor.

16. The bicycle of claim 10, wherein the fuel cell includes at least one hydrogen fuel canister incorporating metal-hydride hydrogen storage.

17. The bicycle of claim 16, wherein the hydrogen fuel canister is removable from the fuel cell.

18. The bicycle of claim 11, wherein the transmission band includes a chain.

* * * * *